(12) United States Patent
Dreger et al.

(10) Patent No.: US 11,084,700 B2
(45) Date of Patent: Aug. 10, 2021

(54) DEVICE FOR TRANSPORTING A CONTAINER

(71) Applicant: KRONES AG, Neutraubling (DE)

(72) Inventors: Kai-Uwe Dreger, Neutraubling (DE); Martin Wagner, Neutraubling (DE)

(73) Assignee: KRONES AG, Neutraubling (DE)

( * ) Notice: Subject to any disclaimer, the term of this patent is extended or adjusted under 35 U.S.C. 154(b) by 62 days.

(21) Appl. No.: 16/218,306

(22) Filed: Dec. 12, 2018

(65) Prior Publication Data

US 2019/0185308 A1 Jun. 20, 2019

(30) Foreign Application Priority Data

Dec. 14, 2017 (DE) ...................... 10 2017 130 036.8

(51) Int. Cl.
*B67C 3/24* (2006.01)
*B67C 7/00* (2006.01)
(Continued)

(52) U.S. Cl.
CPC .......... *B67C 3/242* (2013.01); *B29C 49/4205* (2013.01); *B65B 3/022* (2013.01); *B65B 7/28* (2013.01); *B65G 47/847* (2013.01); *B67C 3/222* (2013.01); *B67C 7/0013* (2013.01); *B67C 7/0053* (2013.01); *B29C 2049/4664* (2013.01); *B65G 29/00* (2013.01); *B67C 3/28* (2013.01);
(Continued)

(58) Field of Classification Search
CPC .......... B67C 3/242; B67C 3/222; B67C 3/28; B67C 7/0013; B67C 7/0053; B67C 7/0086; B67C 7/006; B67C 2003/228; B67C 2003/2671; B65B 3/022; B65B 7/28; B29C 49/4205; B29C 2049/4664; B65G 47/847; B65G 29/00
See application file for complete search history.

(56) References Cited

U.S. PATENT DOCUMENTS 991,664 A * 5/1911 Strasburger ......... B01F 3/04475
141/62
1,135,102 A * 4/1915 Engelhardt .............. B43K 5/03
141/118
(Continued)

FOREIGN PATENT DOCUMENTS

DE 3927897 2/1991
DE 10137718 2/2003
(Continued)

OTHER PUBLICATIONS

Extended European Search Report from European Patent Application No. EP 18212628.4, dated Oct. 2, 2019 (12 pages).
(Continued)

*Primary Examiner* — Nicolas A Arnett
(74) *Attorney, Agent, or Firm* — Haynes and Boone, LLP.

(57) ABSTRACT

A device for transporting a filled container in a rotary device, for example from a rotary filler to a capper, includes a rotary element rotating about an axis of rotation with a holding element for accommodating the container. The holding element is designed such that the filled container is held so that a container axis, which passes through and is perpendicular to a mouth aperture cross-sectional plane of the container, is oriented below the holding element toward the axis of rotation.

20 Claims, 5 Drawing Sheets

(51) Int. Cl.
  *B65G 47/86* (2006.01)
  *B67C 3/22* (2006.01)
  *B29C 49/42* (2006.01)
  *B65B 7/28* (2006.01)
  *B65B 3/02* (2006.01)
  *B67C 3/28* (2006.01)
  *B67C 3/26* (2006.01)
  *B29C 49/46* (2006.01)
  *B65G 29/00* (2006.01)

(52) U.S. Cl.
  CPC ...... *B67C 7/0086* (2013.01); *B67C 2003/228* (2013.01); *B67C 2003/2671* (2013.01); *B67C 2007/006* (2013.01)

(56) References Cited

U.S. PATENT DOCUMENTS

| | | | |
|---|---|---|---|
| 1,949,536 A | | 3/1934 | Ferguson |
| 3,421,555 A | * | 1/1969 | Smith ............... B65B 43/60 |
| | | | 141/150 |
| 4,456,040 A | * | 6/1984 | Bacroix ............... B67C 3/02 |
| | | | 141/150 |
| 4,617,973 A | * | 10/1986 | Hagan ............... B67D 1/0456 |
| | | | 141/2 |
| 9,963,254 B2 | * | 5/2018 | Chauvin ............... B29C 49/46 |
| 10,500,782 B2 | * | 12/2019 | Desoutter ............ B29C 49/46 |
| 2008/0223477 A1 | * | 9/2008 | Stocchi ............... B67C 3/242 |
| | | | 141/1 |
| 2016/0052190 A1 | * | 2/2016 | Frankenberger ...... B65B 7/2821 |
| | | | 156/500 |
| 2017/0072618 A1 | * | 3/2017 | Desoutter ............ B29C 49/421 |

FOREIGN PATENT DOCUMENTS

| | | |
|---|---|---|
| EP | 2987764 | 2/2016 |
| WO | WO 98/47770 | 10/1998 |
| WO | WO 2007/042880 | 4/2007 |
| WO | WO 2011/007370 | 1/2011 |
| WO | WO 2015/173358 | 11/2015 |

OTHER PUBLICATIONS

Search Report from German Patent Application No. DE 10 2017 130 036.8, dated Jul. 9, 2018 (7 pages).

* cited by examiner

DEVICE FOR TRANSPORTING A CONTAINER

CROSS REFERENCE TO RELATED APPLICATIONS

This application claims priority from German Patent Application No. DE 10 2017 130 036.8, filed on Dec. 14, 2017 in the German Patent and Trademark Office, the disclosure of which is incorporated herein by reference in its entirety.

BACKGROUND

Technical Field

The present invention relates to a device for transporting a container in a rotary device, for example, for transporting a container from a rotary filler to a capper, including a rotary element rotating about an axis of rotation with a holding element for accommodating the container.

Related Art

Containers are normally filled with a filling product in a filler and subsequently transferred by a transfer device to a capper. The filler that is used is often a rotary filler, the design of which means that the containers are subject to a centrifugal acceleration while they are being conveyed and filled by the rotary filler.

Fillers are also known which carry out not only the filling of the container but also steps in the production of the container. Blow-molder/fillers are for example known, in which a container that is to be filled is first formed from a plastic blank in a stretch blow-molding process, with the aid of a blow mold. The container is subsequently filled with filling product while still in the blow mold. Alternatively, the steps of blowing and filling can take place simultaneously. In this case the filling product, for example a fluid, is itself used as a blowing fluid to shape the container.

The containers that are disposed in a rotary blow-molder/filler during blow molding are also subject to a centrifugal acceleration due to the design of the filler.

This centrifugal acceleration can lead to the fluid escaping from the as yet uncapped container. In particular, sloshing-over of the filling product can occur at a transfer point at which the container is transferred from the rotary filler to a transfer device, for example a transfer starwheel, or transferred from the transfer starwheel to a capper.

In particular, this sloshing-over can be induced by an impulse to which the filling product in the container is subject at the transfer point between the rotary filler and the rotary element, and/or at the transfer point between the rotary element and the capper. Due to the centrifugal acceleration, the filling product is pressed against the outer side of the container, raising the level of the filling product on that side and correspondingly inclining the surface of the filling product in the container in an inward direction. At the transfer point, at which there is a change in the axis of rotation about which the container rotates, there is also a change in the direction in which the centrifugal acceleration acts on the container. The container thus traverses an S-shaped curve, in which the transfer point represents the point at which the curvature of the S-shaped curve is zero. Due to the change in direction and the change in the centrifugal acceleration acting on the container, the filling product in the container is subject to an impulse, which acts directly on the filling product. As a result of this, the filling product has a tendency to push suddenly away from the side up which it previously rose in the filler carousel to the opposite side, and rise up this side. The result is a sloshing or rocking motion of the surface of the filling product, which can lead to filling product escaping from the mouth of the as yet uncapped container.

This problem can arise at all transfer points at which a container that has already been filled, but has not yet been closed, is transferred, and can in particular arise at the point of transfer between a filler and a transfer starwheel, at the point of transfer between the transfer starwheel and a capper, and at the point of transfer between two transfer starwheels.

SUMMARY

An improved device for transferring a container from a rotary filler to a capper, by means of which the tendency to slosh over during transfer can be reduced, is described.

Accordingly, a device for transporting a container in a rotary device, generally from the filler to the capper, is provided, including a rotary element rotating about an axis of rotation with a holding element for accommodating the container. The holding element is designed such that a container is held so that a container axis, which passes through and is perpendicular to a mouth aperture cross-sectional plane of the container, is oriented below the holding element toward the axis of rotation.

By means of this orientation of the container, it is possible to weaken or compensate for an impulse acting on the filling product in the container at the transfer point at which the container is transferred from the rotary filler to the device and at which the container is transferred from the device to the capper. In this manner, it is possible to reduce or entirely prevent the filling product in the container sloshing over at the transfer points between the rotary filler and the device and/or between the device and the capper.

The mouth or aperture of the container is defined by a mouth aperture cross-sectional plane, which is usually perpendicular to the container axis. In a container standing upright, or with a mouth facing upwards, the mouth cross-sectional plane is defined by the upper edge of the mouth. In conventional, substantially cylindrical bottles, the container axis coincides with the cylinder axis of the bottle and hence runs through the center of the mouth. The mouth cross-sectional plane is thus also perpendicular to the container axis. In containers with irregular, asymmetrical shapes, however, a container axis does not necessarily pass through the mouth, for example if the mouth area is angled to the side. Nevertheless, in this case too a mouth cross-sectional plane can be defined through the upper edge of the applicable mouth.

In certain embodiments, the holding element includes a pivoting device for pivoting the container between a first position, in which the container is accommodated by the upstream conveying element and the container axis is for example parallel to the axis of rotation, and a second position in which the container axis is oriented toward the axis of rotation of the device below the holding element. In this manner it is possible for the container to be taken over from an upstream element, for example from a rotary filler, in which the containers are conveyed with the container axes substantially parallel to the axis of rotation, and then to be pivoted into the desired position.

The possibility of pivoting the container enables the container to be taken over from the upstream conveying element in any suitable position. By means of a pivoting movement adapted to the position of the container on the upstream conveying element, the impulse acting at the transfer point can be counteracted. Because it is possible to influence the pivoting movement actively, a pivoting of the container can be performed in a manner which is independent of the actual transfer of the container at the transfer point, and which furthermore can be carried out with an acceleration and amplitude which enables a reduction in the tendency to slosh around.

The pivoting movement can take place during the takeover of the container by the holding element, or immediately after this. This compensates for the impulse to which the filling product in the container is subject due to the change in direction, in particular the change in the direction of the centrifugal acceleration, so that the danger of the filling product sloshing out of the container is reduced.

In certain embodiments, the pivoting device can be controlled by means of a cam, a pneumatic cylinder and/or an electromagnet. By this means it is possible to provide an active control of the pivoting device.

In several embodiments, the holding element is designed such that the container can be taken over and transported from the upstream conveying element at a fixed angle. By this means it is possible to weaken or compensate for the impulse acting on the filling product at the transfer point at which the container is transferred from the rotary filler to the device and at which the container is transferred from the device to the capper, without the container being subject to a pivoting movement at the point in time of the transfer. Consequently, the inclination of a container axis relative to the axis of rotation of the device does not change when the container is grasped or released by the holding element. Hence the impulse which the container would apply to the filling product in the case of a pivoting movement is reduced or avoided entirely.

In addition, no elaborate control of the holding element is necessary in the case of such a transfer with an unchanged angle. Because the holding element does not perform a pivoting movement at the transfer points, by means of which the container is pivoted along its axis, sloshing-over of the filling product in the container can be reduced or prevented at the transfer points, i.e. at the transfer point between the rotary filler and the device or the transfer point between the device and the capper.

In several embodiments, the holding element is oriented at an incline to the axis of rotation of the device. By this means the takeover of the container by the holding element is facilitated if the container is disposed on the rotary filler at an incline to the axis of rotation of the rotary filler.

The inclined orientation of the holding element thereby enables the container to be taken over at the transfer point in its inclined position relative to the axis of rotation of the rotary filler. The orientation of the holding element at an incline to the axis of rotation of the device enables it to hold the container such that, at the transfer point from the device to the capper, the container axis has an inclination, with respect to the axis of rotation of the capper, at which the container is held during its further transport on the capper.

In various embodiments, the holding element has a pair of clamps for applying a clamping force to the container. The pair of clamps serves to grip the container. By means of the clamping force, the device can be held securely during its transport on the device.

In some embodiments, the rotary filler is a blow-molder/filler for blow molding and filling plastic containers. In a blow-molder/filler, the blow molds are usually inclined outwards in order to achieve higher performance, so that the container axis faces away from the axis of rotation of the blow-molder/filler below the blow molds. Accordingly, when the filled containers are subsequently transferred to the device they do not need to undergo a pivoting movement, and the containers are further transported in an orientation which substantially corresponds to the orientation of the containers in the blow-molder/filler after their removal from the mold. Thus no pivoting of the containers is necessary when they are transferred from the blow-molder/filler to the transporting device, with the result that the container does not subject the filling product accommodated in the container to an impulse, and thus sloshing-over can be reduced or avoided.

In certain embodiments, the device further includes a covering device for covering the mouth of the container. By this means it is possible to prevent escape of filling product from the container through its mouth while the container is being transported by the device. The covering device can be switched between two positions, with the covering device being lowered onto the mouth of the container at the transfer point at which the container is transferred from the rotary filler to the device. This takes place either simultaneously with the container making contact with the holding element, or after the container has been received by the holding element. At the transfer point at which the container is transferred from the device to the capper, the covering device is removed from the mouth of the container. The container is then in an open state and can be brought into contact with a closing element. The removal of the covering device from the mouth of the container can be carried out simultaneously with the transfer of the container from the holding element. Alternatively, the separation of the covering device from the mouth of the container is prior to or subsequent to the separation of the container from the holding element.

In various embodiments, the covering device provides an additional clamping force for holding the container in place in the holding element. By this means it is possible to enable a safer transport of the container on the device. Thus the safety of the transfer of the container from the rotary filler to the capper can be increased. If, for example, the container is not optimally accommodated by the holding element, release of the container from the holding element can be impeded by the clamping force exerted by the covering device. The clamping device and the holding element can thereby be configured with respect to each other such that the clamping force exerted by the covering device facilitates the adoption by the container of an ideal position when accommodated in the holding element.

In several embodiments, the covering device can seal the container in a gas-tight manner. This is particularly advantageous in the case of carbonated filling products, since by this means no gas is able to escape from the interior of the container during transport on the device. In addition, a mouth that is sealed gas-tight also prevents the entry into the container of undesired gases or dirt or dust from the environment.

In some embodiments, the covering device can be controlled by means of a cam, a pneumatic cylinder and/or an electromagnet. By this means it is possible to provide an active control of the covering device.

In certain embodiments, the covering device is displaceable in a rotary and/or translational manner. By this means it is possible to provide closing and opening of the mouth of the container with as small as possible a range of movement of the covering device.

In various embodiments, the covering device includes a treatment device for cooling and/or rinsing the container. By means of a treatment device for cooling it is possible to cool a head space of the container with a gas during the transfer process, i.e. during the transport of the container on the device. This makes it possible to prepare the ideal conditions for the closing process in the head space and/or the filling product that is present in the head space. Cooling the head space or the threaded area of the container is particularly important when a blow-molder/filler is used and the head area is still warm after removal from the blow mold.

By means of a treatment device for rinsing the container, the head space of the container can be rinsed, for example with carbon dioxide or nitrogen, during the transfer process. This enables the head space of the container to be prepared for the subsequent closing process. In this manner, undesired gases which have entered the head space of the bottle after the filling process can be removed. A nitrogen injector can also be provided, in order to introduce nitrogen dropwise into the head space. Alternatively, a treatment device for rinsing can also be used to destroy foam that has formed in the head space after or during the filling process. The treatment device can further be designed such that it can be used to clean a screw thread on an exterior surface of the mouth area of the container.

In addition, a system is provided which includes a blow-molder/filler for blow molding and subsequently filling a plastic container, a device for transporting a container from the blow-molder/filler to a capper, and a covering device for covering a container accommodated by the device.

By this means it can be ensured that no filling product escapes from the container during the transport of the container with the device. The states in which a mouth of the container is not closed, i.e. not covered, can thereby be reduced. When the container is still in the blow-molder/filler, the mouth of the container is closed by the filling element during the filling process. When the container is in the device for transporting the container from the blow-molder/filler to the capper, the mouth of the container is closed by the covering device. After the transfer of the container from the device to the capper, the mouth of the container is closed with a suitable closing element, for example a cap. The states in which the mouth of the container filled with filling product is open can therefore be reduced to the points of transfer, i.e. the point of transfer of the container from the blow-molder/filler to the device and the point of transfer of the container from the device to the capper.

In various embodiments, the device includes a holding element which is designed such that a container axis, which passes through and is perpendicular to a mouth aperture cross-sectional plane of the container, is oriented toward the axis of rotation below the holding element.

By this means it is possible, at the transfer point at which the container is transferred from the blow-molder/filler to the device and at which the container is transferred from the device to the capper, to transfer the container without the container being subject to a pivoting movement at the point in time of the transfer. Consequently, the inclination of a container axis relative to the axis of rotation of the device does not change when the container is grasped or released by the holding element. Accordingly, it is possible to reduce or prevent the filling product in the container sloshing over at the transfer points between the rotary filler and the device and/or between the device and the capper.

In several embodiments, the covering device includes a treatment device for cooling and/or rinsing the container. By means of a treatment device for cooling it is possible to cool a head space of the container with oxygen during the transfer process, i.e. during the transport of the container by the device. This makes it possible to prepare the head space of the container for the closing process.

BRIEF DESCRIPTION OF THE FIGURES

Further embodiments and aspects of the present invention are more fully explained by the description below of the figures.

DETAILED DESCRIPTION

Examples of embodiments are described below with the aid of the figures. In the figures, elements which are identical or similar, or have identical effects, are designated with identical reference signs, and repeated description of these elements is in part dispensed with in the description below, in order to avoid redundancy.

Figure 1:
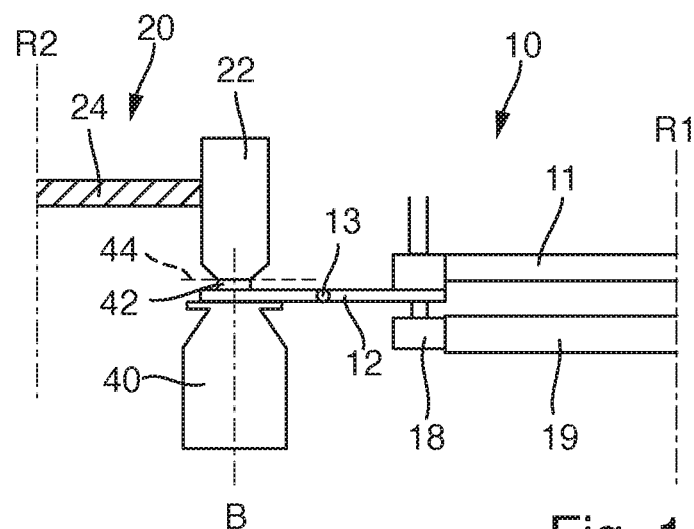
FIG. 1 is a schematic side elevation of a device for transporting a container from a rotary filler to a capper, shortly before the point of transfer.

FIG. 1 discloses a device 10 for transferring a container 40 from a rotary filler to a capper. The device 10 includes a transfer starwheel 11, which rotates about an axis of rotation R1. Extending radially outwards from the transfer starwheel 11 is a holding element 12, which is suitable for accommodating and transporting a container 40. FIG. 1 shows the device 10 shortly before the point of transfer at which the container is transferred from the rotary filler to the device 10. In this situation, a filling element 22 of the rotary filler is still disposed on a mouth 42 of the container 40. The filling element 22 is provided on the rotary filler, and rotates with the carousel of the rotary filler about an axis of rotation R2. On the carousel of the rotary filler, not only the filling element 22 but also a holder for the container during filling is provided. During the filling process, the orientation of the container 40 is such that a container axis B of the container 40 is parallel to the axis of rotation R2 of the rotary filler.

The holding element 12 is capable of accommodating the container 40 in its orientation in the filling element. In the example embodiment that is shown, the container axis B extends parallel to the axis of rotation R2 of the rotary filler, so that a transfer of the container to the device 10 takes place in the same orientation.

The container 40 has a mouth 42 which faces upwards, and whose upper edge defines a mouth cross-sectional plane 44. In the example embodiment that is shown, in which the container 40 is in the form of a conventional, substantially cylindrical bottle, the mouth cross-sectional plane 44 is perpendicular to the container axis B, which coincides with the cylinder axis of the bottle. With different shapes of container, the mouth 42 can however be disposed in any manner relative to the other parts of the container 40, and for this reason reference is made below to the mouth cross-sectional plane 44. It is only via the mouth 42 that defines the outer edge of the mouth cross-sectional plane 44 that filling product can escape from the filled container 40.

Because the container 40 is taken over by the device 10 from a rotary filler, the container 40 is already filled with the filling product when it is taken over.

The holding element 12 can have clamps, by means of which it can grip a neck of the container 40, as shown by way of example in FIG. 1. The opening and closing of the clamps of the holding element 12 is controlled via a roller cam follower 18 which is driven by a cam disk 19.

Figure 2:
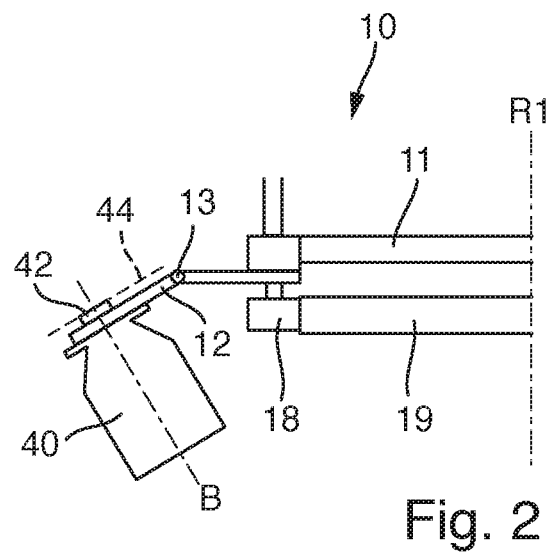
FIG. 2 is a schematic representation of the device from FIG. 1 shortly after the point of transfer.

FIG. 2 shows the device 10 from FIG. 1 shortly after the transfer of the container 40 to the device 10. During or immediately after the transfer, the holding element 12 was bent by means of a pivoting device 13 to form an angle, so that the container 40 is held in a position in which the mouth cross-sectional plane 44 of the container 40 is disposed such that the container axis B, which is perpendicular to the mouth cross-sectional plane 44, is oriented toward the axis of rotation R1 below the holding element 12. By this means, the impulse acting on the filling product in the container 40 due to the transfer can be weakened or compensated for. Accordingly, by means of the pivoting movement which the holding element 12 carries out subsequent to the point of transfer, it is possible to reduce or prevent the filling product in the container 40 sloshing over, since the impulse on the filling product can in this manner be absorbed or compensated for.

Figure 3:
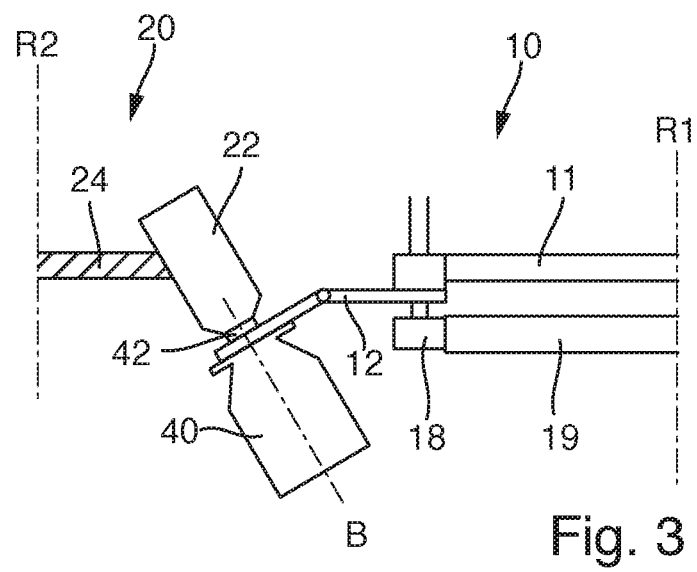
FIG. 3 is a schematic representation of a further device for transporting a container from a rotary filler to a capper, shortly before a point of transfer.

FIG. 3 discloses a further device 10 for transferring a container 40 from a rotary filler to a capper. The device 10 includes a transfer starwheel 11, which rotates about an axis of rotation R1. Extending radially outwards from the transfer starwheel 11 is again a holding element 12, which is suitable for accommodating and transporting a container 40. The holding element 12 is bent at a fixed angle, in order to accommodate the container 40 in the inclined orientation in which the container was disposed during a prior filling process. FIG. 3 shows the device 10 shortly before the point of transfer at which the container is transferred from the filling element 22 to the device 10. In this situation, a filling element 22 of the rotary filler is still disposed on a mouth 42 of the container 40. The filling element 22 is again here a part of the rotary filler, and rotates about an axis of rotation R2. During the filling process, the container 40 is in an inclined position, in which the mouth aperture cross-sectional plane 44 of the container 40 is inclined toward the axis of rotation of the rotary filler, and the container axis B, which is perpendicular to the mouth cross-sectional plane 44, is below the holding element 12 inclined away from the axis of rotation R1. By this means, sloshing-over due to a centrifugal acceleration which the container undergoes during the filling process can be prevented, and the filling of the container can be facilitated.

Such an arrangement of the container 40 with an inwards-oriented mouth exists particularly in the case of rotary blow-molder/fillers, in which the blow molds are disposed in an inclined orientation, so that the centrifugal acceleration further assists the blowing process. When the containers are removed from the mold after the blowing and filling process, they are accordingly disposed in the rotary blow-molder/filler in the orientation that is shown, so that they can be directly taken over by the device 10 while in this orientation.

The angled holding element 12 is thus not pivotable, and can take over the container in the orientation required by the blow molder. Thus the container 40 can be transferred from the filling element to the device 10 without undergoing a pivoting movement. This helps to avoid the escape of the filling product in the container 40.

The holding element 12 can have clamps, by means of which it can grip a neck of the container 40, for example as shown in FIG. 3. The opening and closing of the clamps of the holding element 12 is controlled via a roller cam follower 18 which is driven by a cam disk 19.

Figure 4:
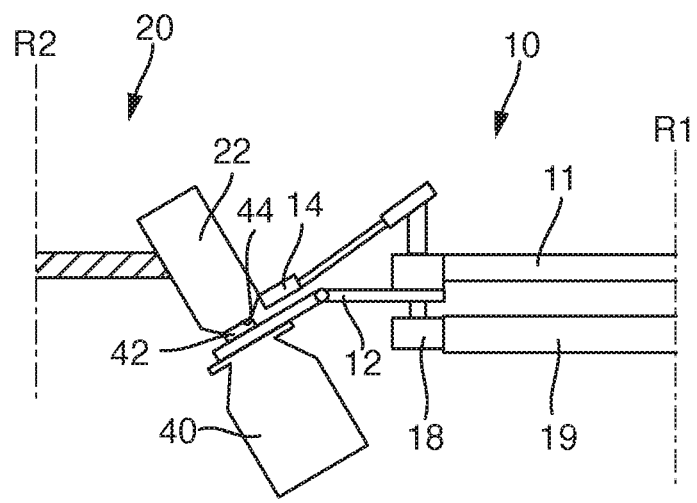
FIG. 4 is a schematic representation of a further device for transporting a container from a rotary filler to a capper, showing a covering device in a first position.

FIG. 4 shows a further embodiment of a device 10, which differs from the device shown in FIG. 3 in that an additional covering device 14 is configured to cover the mouth 42 of the container 40. In FIG. 4, the covering device 14 is in a passive position, in which it is not in contact with the mouth 42.

Figure 5:
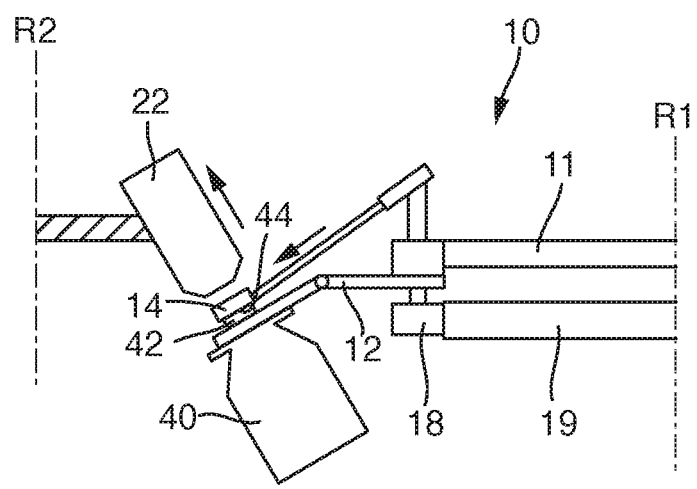
FIG. 5 is a schematic representation of the device from FIG. 4, in which the covering device is disposed in a second position.

FIG. 5 shows the device 10 from FIG. 4 in a position shortly after the point of transfer at which the device 10 has received the container 40 from the rotary filler. In this state the filling element 22 is no longer in contact with the container 40. The covering device 14 is in an active position, in which the covering device 14 is in contact with the container 40 and closes the mouth 42. The orientation of the covering element 14 is controlled via the roller cam follower 18, which is driven by the cam disk 19. Alternatively, the control can be by means of a pneumatic cylinder or an electromagnet. Accordingly, the control of the covering device 14 is coupled with the control of the clamps of the holding element 12. Alternatively, the covering device and the clamps of the holding element can be separately controlled.

In the state shown in FIG. 5, the covering element 14 exerts an additional clamping force on the container 40, in order to hold it in place in the holding element 12. At the same time the covering device 14 seals, in a gas-tight manner, an interior space of the container, in particular a head space, against the environment.

Figure 6:
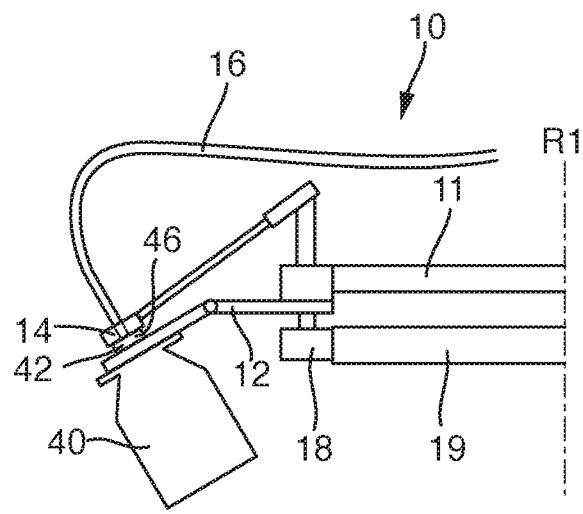
FIG. 6 is a schematic representation of a device for transporting a container from a rotary filler to a capper, with a treatment device.

FIG. 6 discloses a further embodiment of the device 10, which differs from the devices shown in FIGS. 4 and 5 in that the covering device 14 has an additional treatment device 16. By means of the treatment device 16, which is designed in the form of a hose, it is possible to rinse the head space 46 of the container 40 with a fluid. A rinsing gas, which enters the head space 46 through the treatment device 16, can be used to destroy foam that has formed in the head space 46 of the container 40. Alternatively, by means of the treatment device 16 it is possible to gas the head space 46 with $CO_2$. It is further possible for a nitrogen injector to be connected with the head space 46 via the treatment device 16 for introducing liquid nitrogen dropwise into the head space 46.

The outlet of the hose of the treatment device 16 in the covering device 14 can have one or more nozzles, by means of which a suitable cleaning and/or rinsing medium can be introduced into the head space 46.

Figure 7:
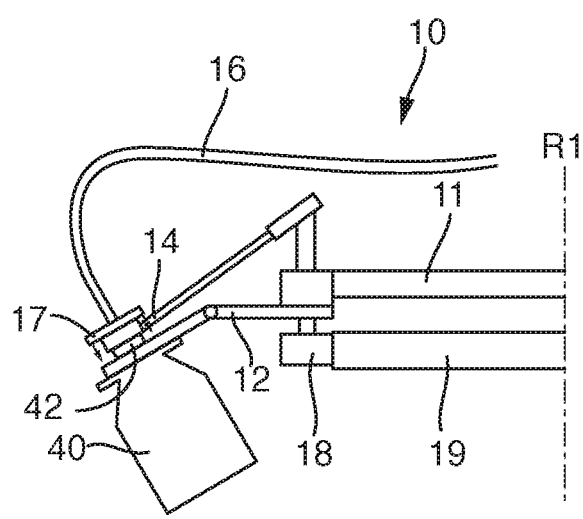
FIG. 7 is a schematic representation of a device for transporting a container from a rotary filler to a capper, with a further treatment device.

FIG. 7 discloses an embodiment of the device 10 which differs from the device shown in FIG. 6 in that the treatment device 16 has additional nozzles 17 in the region of the covering device 14, which make it possible to clean the region of the exterior of the container 40 that adjoins the mouth 42. By this means, for example, a screw thread of the container 40 can be cleaned.

Figure 8:
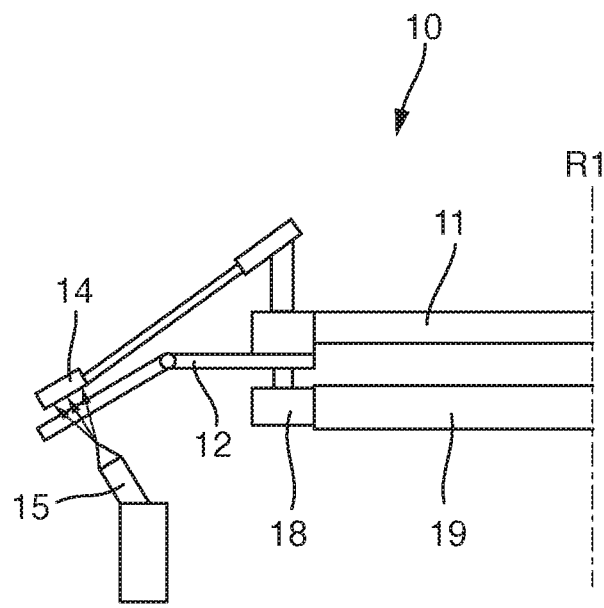
FIG. 8 is a schematic representation of a device for transporting a container from a rotary filler to a capper, with another further treatment device.

FIG. 8 discloses the device 10 in a state in which there is no container in the holding element 12. The device 10 that is shown in FIG. 8 includes a cleaning nozzle 15, which is disposed in a region in which a container would be present in the transportation state. By means of the cleaning nozzle 15, it is possible to clean the covering device 14, in that the cleaning nozzle 15 sprays the covering device 14 with a cleaning fluid. The cleaning takes place in particular of the region of the covering device 14 that comes into contact with a container in the transportation state. In addition, the cleaning nozzle 15 can be used to clean the holding element 12.

Figure 9:
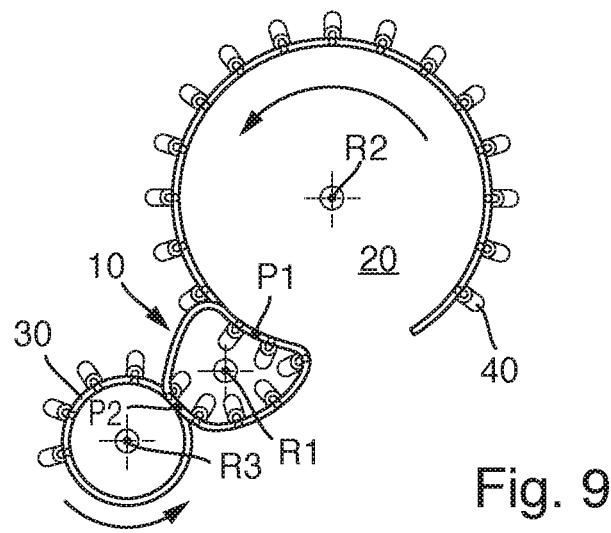
FIG. 9 is a schematic representation of the transport path of a container from a filling element via a device for transferring it to a capper.

FIG. 9 discloses an overview of an arrangement of the rotary filler 20, the device 10 with a holding element 12 which is bent at a fixed angle, and the capper 30. FIG. 9 indicates in particular the transport path of a container 40 along the rotary filler 20, the device 10 and the capper 30.

When the container 40 is in the rotary filler 20, the container 40 is displaced counterclockwise about an axis of rotation R2 of the rotary filler 20. During the transport of the container 40 on the rotary filler 20, the container 40 has an inclined orientation. In this inclined orientation, the mouth aperture cross-sectional plane of the container 40 is inclined toward the axis of rotation R2. By this means it is possible to counteract the sloshing-over of the filling product in the container 40, which is caused by the centrifugal acceleration that the container 40 undergoes due to the rotary filler 20.

At a first transfer point P1, the container 40 is transferred from the rotary filler 20 to the device 10. A holding element of the device 10 grips the container 40 at the first transfer point P1. Because of the angled design of the holding element 12 that was shown in the previous figures, it is possible to maintain the inclined orientation of the container 40 at the first transfer point P1. Thus during the transfer of the container 40 from the rotary filler 20 to the device 10, the container 40 maintains its inclined orientation. Because of this, at the first transfer point P1 the container 40 does not undergo a pivoting displacement, which could subject a filling product in the container 40 to an impulse due to the pivoting of the container 40, causing the filling product to escape from the container 40.

The container 40 is conveyed by means of the device 10 from the first transfer point P1 to a second transfer point P2, at which the container 40 is transferred to the capper 30. During the transport of the container 40 on the device 10, the mouth aperture cross-sectional plane 44 of the container 40 is inclined away from the axis of rotation R1 of the device 10.

Thus the container 40 has an inclined orientation at the second transfer point P2, with the mouth aperture cross-sectional plane 44 of the container 40 inclined toward the axis of rotation R3 of the capper. This inclined orientation of the container 40 represents the arrangement of the container 40 relative to the axis of rotation R3 of the capper 30, in which the container 40 is further conveyed by the capper 30 beyond the second transfer point P2. Thus at the second transfer point P2 the container 40 again does not undergo a pivoting displacement which could cause a filling product in the container 40 to escape from the container 40.

It is particularly advantageous for the device 10 to be designed such that the holding element follows the circular path of the container 40 in the rotary filler 20 along a portion of the path around the actual transfer point, for example by means of a cam-controlled transfer starwheel. This avoids transfer at a single point only, and the holding element has sufficient time for a safe transfer. Sufficient time also thereby remains, for example, for the covering element which was shown for example in FIGS. 4 and 5 to be applied to the container 40 while it is still in the rotary filler 20. This means that the container 40 does not leave the circular path of the rotary filler 20 until after the container 40 has been secured by means of the covering element against the escape of the filling product.

This avoids the effect by which the mouth aperture cross-sectional plane 44 of the container 40 is inclined away from the axis of rotation R1 of the device 10 and hence filling product could escape due to the centrifugal force produced by this arrangement.

The transfer of the container 40 to the capper 30 can in turn take place such that the holding element of the device 10 follows the circular path of the capper along a certain portion of the path. By this means a safe transfer can be achieved, in a similar manner to the transfer from the rotary filler.

Additionally, the covering element can be removed only after a certain period of time, or after a certain section of the path has been traversed following the transfer of the container 40. By this means any sloshing motions of the filling product that may arise in the container 40 due to the transfer can settle.

Alternatively, the rotary filler 20, the device 10 and the capper 30 can rotate in the opposite direction from that shown.

To the extent applicable, all individual features described in the individual example embodiments can be combined with each other and/or exchanged, without departing from the field of the invention.

What is claimed is:

1. A system, comprising:
a rotary filler comprising a holder for a container during filling; and
a device configured to transport a filled container from the rotary filler to a capper, wherein the device comprises:
a rotary element rotating about an axis of rotation and comprising a holding element configured to accommodate the filled container, wherein:
the holding element holds the filled container so that a container axis, which passes through and is perpendicular to a mouth aperture cross-sectional plane of the filled container, is oriented below the holding element toward the axis of rotation, and
the holding element comprises a pivoting device configured to pivot the filled container between a first position, in which the filled container is held in the rotary filler, and a second position in which the container axis is oriented toward the axis of rotation below the holding element.

2. The system of claim 1, wherein the pivoting device is controlled by means of a cam, a pneumatic cylinder and/or an electromagnet.

3. The system of claim 1, wherein the holding element is configured to transport the filled container at a fixed angle.

4. The system of claim 1, wherein the holding element is oriented at an incline to the axis of rotation.

5. The system of claim 1, wherein the holding element comprises a clamp configured to apply a clamping force to the filled container.

6. The system of claim 1, wherein the holding element is configured to move the filled container from the rotary filler without pivoting.

7. The system of claim 1, further comprising a covering device configured to cover a mouth of the filled container.

8. The system of claim 7, wherein the covering device is further configured to provide an additional clamping force for holding the filled container in place in the holding element.

9. The system of claim 7, wherein the covering device is further configured to seal the filled container.

10. The system of claim 7, wherein the covering device comprises a treatment device configured to cool and/or rinse the filled container.

11. The system of claim 10, wherein the treatment device comprises a plurality of nozzles configured to clean an exterior of the container.

12. The system of claim 7, further comprising a cleaning nozzle configured to clean the covering device.

13. A system comprising:
- a blow-molder/filler configured to blow-mold and fill a container, wherein the blow-molder/filler comprises a holder for the container during filling;
- a device configured to transport a filled container from the blow-molder/filler to a capper, wherein:
  - the device comprises a holding element configured to hold the filled container so that a container axis, which passes through and is perpendicular to a mouth aperture cross-sectional plane of the filled container, is oriented below the holding element toward an axis of rotation, and
  - the holding element comprises a pivoting device configured to pivot the filled container between a first position, in which the filled container is held in the blow-molder/filler, and a second position in which a container axis is oriented toward the axis of rotation below the holding element; and
- a covering device configured to cover a mouth of the filled container accommodated in the device.

14. The system of claim 13, wherein the pivoting device is controlled by means of a cam, a pneumatic cylinder and/or an electromagnet.

15. The system of claim 13, wherein the holding element is configured to transport the filled container at a fixed angle.

16. The system of claim 13, wherein the holding element comprises a clamp configured to apply a clamping force to the filled container.

17. The system of claim 13, wherein the covering device is further configured to provide an additional clamping force for holding the filled container in place in the holding element.

18. The system of claim 13, wherein the covering device comprises a treatment device configured to cool and/or rinse the filled container.

19. The system of claim 18, wherein the treatment device comprises a plurality of nozzles configured to clean an exterior of the container.

20. The system of claim 13, wherein the device further comprises a cleaning nozzle configured to clean the covering device.

* * * * *